UNITED STATES PATENT OFFICE.

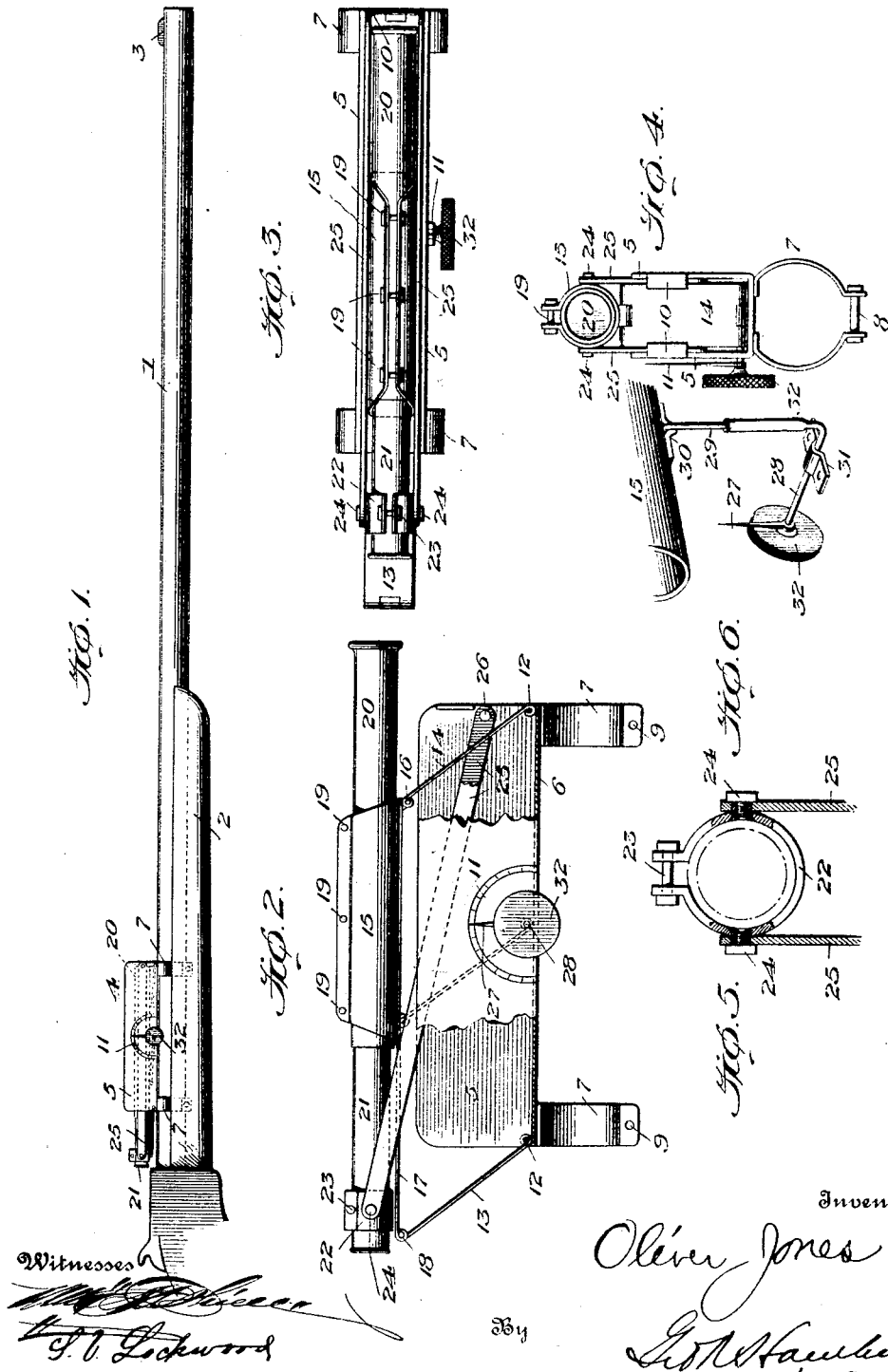

OLIVER JONES, OF CHANDLER, ARIZONA.

TELESCOPE-SIGHT FOR FIREARMS.

1,129,298.  Specification of Letters Patent.  Patented Feb. 23, 1915.

Application filed June 12, 1914. Serial No. 844,777.

*To all whom it may concern:*

Be it known that I, OLIVER JONES, a citizen of the United States, residing at Chandler, county of Maricopa, and State of Arizona, have invented certain new and useful Improvements in Telescope-Sights for Firearms, of which the following is a specification.

This invention relates to telescope sights for firearms.

My object is to provide an improved adjustable telescope sight, more particularly, an improved adjustable mounting or carriage for a sectional telescope sight, whereby the sections of the telescope will be drawn out as the telescope is moved, to cause the telescope to accurately focus on the object aimed at, according to the range. Preferably, I provide a scale or dial for use as a range indicator, but in its broader aspect, the invention is not limited to the provision of a range indicator, and in such broadest aspect, contemplates the provision of a self-adjusting telescope sight which will automatically focus according to the range; in another aspect, it embraces an improved telescope sight and mounting in combination with a range indicator; and in still another aspect, the invention consists of an improved mounting for a telescope sight, whereby the telescope will be drawn out, as it is adjusted to the range, to cause it to accurately focus on the object aimed at, according to the range.

The invention also consists in a telescope sight and telescope sight mounting comprising means which mount the telescope so that it can be bodily moved, combined with means for automatically extending or drawing out the sections of the telescope as it is bodily shifted, whereby it focuses on the object aimed at.

One embodiment of the invention is set forth hereinafter and shown in the drawings, but such is to be considered as illustrative, rather than restrictive, of the scope of the invention, as the latter is subject to various modifications.

In the accompanying drawings: Figure 1 is a side elevation of a rifle equipped with my improved sight; Fig. 2, an enlarged side elevation with certain parts broken away, showing the invention, the telescope being in raised position; Fig. 3, a detail plan with the telescope in lowered position; Fig. 4, a right-hand end elevation of Fig. 2; Fig. 5, a detail view, partly in section, showing the clamps and pivots for the rear or slidable telescope section; and Fig. 6, a detail perspective showing the means for moving the telescope mounting and the range indicator needle.

In Fig. 1, the barrel of the rifle appears at 1 and the stock at 2.

My invention is used as a rear sight. The firearm may also have a front sight, as shown at 3, for sighting at short ranges, but even this is unnecessary, as the object and purpose of my invention is to provide an automatically adjustable telescope sight which will be so mounted that when it is focused on an object, the firearm will be properly pointed or aimed at the object, according to the range. I prefer, however, to use the present invention by itself for relatively long ranges and to employ any suitable front sight 3 for short or ordinary ranges.

My invention 4 may be located at any suitable point on the rear portion of the barrel 1. There is a housing and guide composed of parallel vertically arranged walls 5 and a connecting bottom 6, affording a relatively narrow trough-shaped receptacle which has clamps 7 suitably connected to the bottom and provided with adjusting screw-bolts 8 passing through holes 9. The clamps 7 embrace the barrel 1 and the lower portions thereof are disposed between the stock 2 and the barrel, the stock being provided with recesses to receive the heads and nuts of the bolts 8, by which means the sight is firmly clamped to the barrel and prevented from slipping either longitudinally or transversely in relation thereto. At the forward ends of the sides or walls 5 are flanges or stops 10, and there is indicated on one of the walls, or attached thereto, a dial or range indicator scale 11. Pivoted at 12 are rockers 13 and 14, the latter being shorter than the former and positioned to be arrested by the stops or flanges 10 when the rockers are in vertical position. The rocker 14 is but slightly narrower than the distance between the walls 5, and consequently, it is guided by said walls, but the pivots of the rockers may be sufficiently tight so that such guiding of the rocker 14 is unnecessary. A clamp 15 is pivoted to rocker 14 at 16 and has an extension 17 pivoted to rocker 13 at 18. The clamp 15 is provided with screw-bolts 19. The telescope has its forward section 20 resting in the clamp 15 and rigidly held thereby, due to the tension of the bolts 19. The rear section 21 of the telescope, which is adjustable or slidable in relation to the front section 20, carries a clamp 22 which is rigidly secured thereto by screw-bolt 23. Pivoted at 24 to the clamp 22 and disposed on opposite sides thereof are the levers or links 25 which are pivoted at their forward ends 26 to the forward portions of the sides 5. The relation of the effective lengths of the rockers 13 and 14, links 25 and focal distances of the telescope sections 20, 21 in respect to the distance between the sight and the muzzle of the rifle barrel 1 is such that the telescope sections 20, 21 are extended or telescoped in the proper manner to afford the proper focusing of the telescope on the object sighted, whatever the range. In other words, by swinging the telescope, it automatically focuses and affords a clear image of the object according to the range so that by merely sighting through the telescope and obtaining a clear focus on the object, the user of the firearm automatically points the firearm so that the proper trajectory will be followed by the projectile to strike the object aimed at. If desired, the front sight 3 may be entirely dispensed with, but I prefer to employ it for use at short ranges. The mounting afforded by the rockers 13, 14 and the links 25 is such that the telescope will automatically focus as aforesaid and any desired means may be employed for moving it, but I prefer to provide a scale 11 to indicate the range in connection with a pointer 27 carried by a shaft 28 which has an arm 29 journaled to the clamp 15 at 30. The arm 29 consists of relatively slidable sections. The shaft 28 is journaled in a bearing 31 on the bottom 6 and said shaft is provided with a finger-wheel 32 by which it may be turned to set the pointer 27 at the desired range. Such turning of the finger-wheel 32 shifts the clamp 15 which, in turn, elevates or lowers the telescope and causes extension or contraction of the section 21 in relation to the section 20. When the telescope is lowered, it is preferably completely housed within the receptacle composed of the walls 5 and bottom 6, as shown in Fig. 1, and when raised to a given range, it will appear as shown in Fig. 2. I prefer to employ pivots such as shown at 24 in Fig. 5, for the links 25.

Having thus described my invention, what I claim as new and desire to secure by Letters Patent, is:—

1. In a firearm sight, the combination with a movably mounted sectional telescope, of means for automatically extending or contracting the sections of the telescope when the latter is moved.

2. In a firearm sight, the combination with a bodily movable telescope having means for changing its focus, of means for automatically operating the first-named means as said telescope is moved.

3. In a firearm sight, the combination with a sectional telescope, of mounting rockers therefor differing in effective length, and means for extending and contracting the sections of the telescope as said telescope swings with said rockers.

4. In a firearm sight, the combination with a sectional telescope, of mounting rockers therefor differing in effective length, and a pivoted link for extending and contracting the sections as the telescope swings with said rockers.

5. In a firearm sight, the combination with a sectional telescope, of mounting rockers therefor differing in effective length, means for extending and contracting the sections of the telescope as said telescope swings with said rockers, and a range indicator operated by the movement of the telescope.

6. In a firearm sight, the combination with a sectional telescope, of mounting rockers therefor differing in effective length, a pivoted link for extending and contracting the sections as the telescope swings with said rockers, an arm for moving the telescope, and a range-indicator coöperating with the arm.

7. In a firearm sight, the combination with a sectional telescope, clamps adjustably connected to the sections of said telescope, rockers connected to one of said clamps, and a pivoted link connected to the other clamp, whereby when the telescope is swung, it is extended or contracted.

8. In a firearm sight, the combination with a housing and means for connecting it to the firearm, of rockers pivoted to the housing, a telescope carried by said rockers and adapted for reception within the housing, and a link pivoted to the housing adapted for changing the focus of the telescope during its movements in relation to the housing.

9. In a firearm sight, the combination with a housing and clamps carried thereby adapted to embrace the firearm barrel, of a sectional telescope, a clamp adjustably secured to said telescope, and means movably connecting the clamp to the housing, said telescope and clamp being adapted for reception in the housing.

10. In a firearm sight, the combination with a housing and clamps carried thereby adapted to embrace the firearm barrel, of a sectional telescope, a clamp adjustably secured to said telescope, means movably connecting the clamp to the housing, said telescope and clamp being adapted for reception in the housing, and means for changing the focus of the telescope as it moves in relation to the housing.

11. In a firearm sight, the combination with a housing having side walls and clamps adapted to engage a firearm, of rockers pivoted to the housing, a clamp to which said rockers are pivoted, a sectional telescope secured to said clamp, another clamp secured to a section of the telescope, a link pivoted to the clamp last-named and to the housing, whereby the telescope may be disposed within the housing or moved in relation thereto and will be extended or contracted during its movements, a shaft, a connection between the shaft and the clamp first-named, a finger-piece carried by the shaft, whereby said shaft may be turned, a pointer carried by the shaft, and a range indicating dial with which said pointer coöperates, whereby the range is indicated.

In testimony whereof, I hereunto affix my signature in presence of two witnesses.

OLIVER JONES.

Witnesses:
ARTHUR E. PRICE,
G. L. GOLLAUDS.

Copies of this patent may be obtained for five cents each, by addressing the "Commissioner of Patents, Washington, D. C."